United States Patent
Young

(10) Patent No.: US 6,786,503 B1
(45) Date of Patent: Sep. 7, 2004

(54) DRYWALL CART

(76) Inventor: Larry P. Young, 1165 62 Ave. SE., Grand Forks, ND (US) 58201

( * ) Notice: Subject to any disclaimer, the term of this patent is extended or adjusted under 35 U.S.C. 154(b) by 0 days.

(21) Appl. No.: 10/160,861

(22) Filed: May 31, 2002

(51) Int. Cl.[7] ............................................... B62B 3/02
(52) U.S. Cl. ..................... 280/656; 280/651; 280/79.3; 280/79.11; 280/35
(58) Field of Search ............................. 280/651, 79.3, 280/79.7, 79.11, 33.997, 47.11, 47.19, 39, 47.24, 638, 47.315, 47.34, 656, 47.35, 35, 47.371, 144, 147, 38, 42, 641; 211/191, 195, 182; 248/166, 129, 150; D34/17, 23, 24

(56) References Cited

U.S. PATENT DOCUMENTS

| | | | | |
|---|---|---|---|---|
| 3,278,042 A | * | 10/1966 | Frydenberg ................... | 410/32 |
| 4,637,626 A | * | 1/1987 | Foss et al. .................... | 280/655 |
| 5,249,823 A | * | 10/1993 | McCoy et al. ............... | 280/656 |
| 6,036,219 A | * | 3/2000 | Oefelein et al. ............ | 280/638 |
| 6,109,644 A | * | 8/2000 | Cox ........................... | 280/652 |
| 2003/0030239 A1 | * | 2/2003 | Woerner ................... | 280/47.35 |
| 2003/0164602 A1 | * | 9/2003 | Kuhlman ................... | 280/79.7 |

* cited by examiner

Primary Examiner—Brian L. Johnson
Assistant Examiner—J. Allen Shriver
(74) Attorney, Agent, or Firm—Robert E. Kleve

(57) ABSTRACT

The invention comprises a panel carrying cart having an elongated overall frame formed of a pair elongated frame sections pivotally mounted about a horizontal axis at their inner ends. The frame sections are each formed of a pair of parallel rods and upright end frames. A plurality of lateral frame rods are adjustably mounted along the length of the parallel rods of the front and rear frames so that the lateral rods may be moved to different locations to better accommodate loads carried on the lateral rods of the cart. A pair of L shaped lateral rods each have one end mounted in the lateral rods with their other ends extending upward to hold panels or other objects on the lateral frames on the cart. Wheels are mounted to the front and rear frames for moving the cart about to different locations with panels or other object thereon.

1 Claim, 3 Drawing Sheets

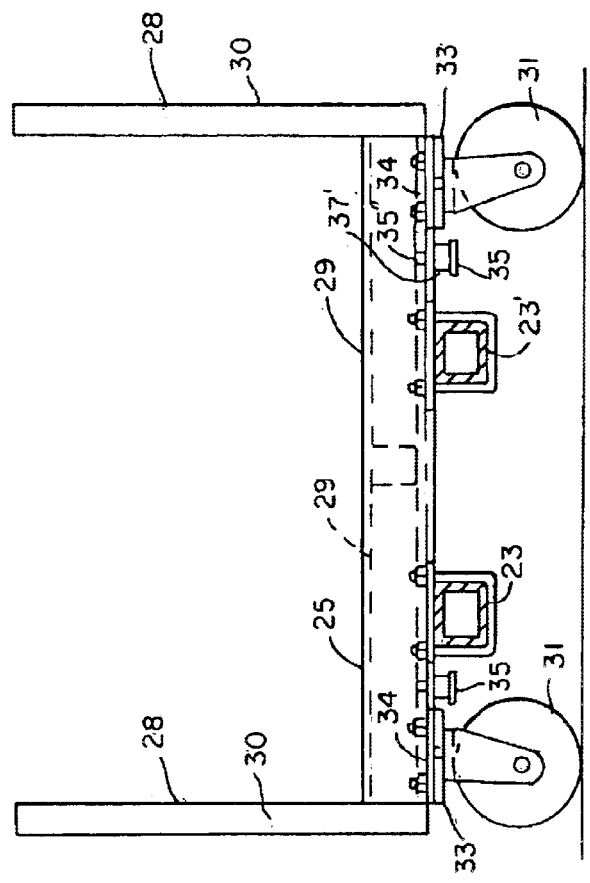
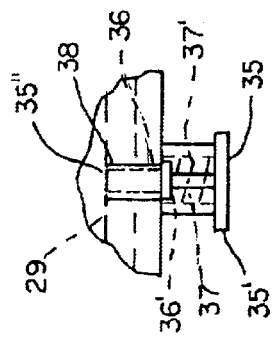
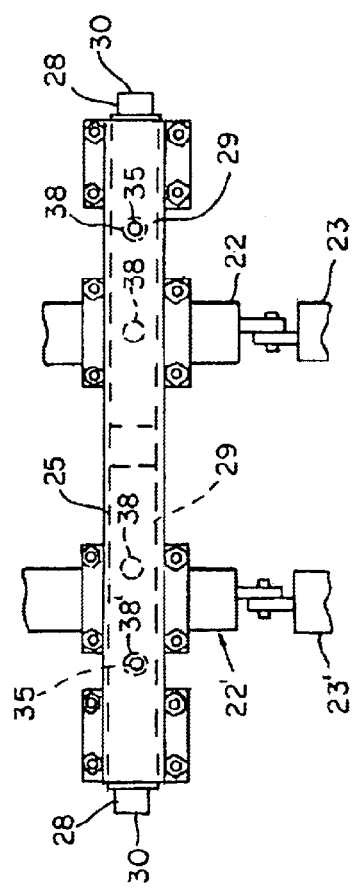

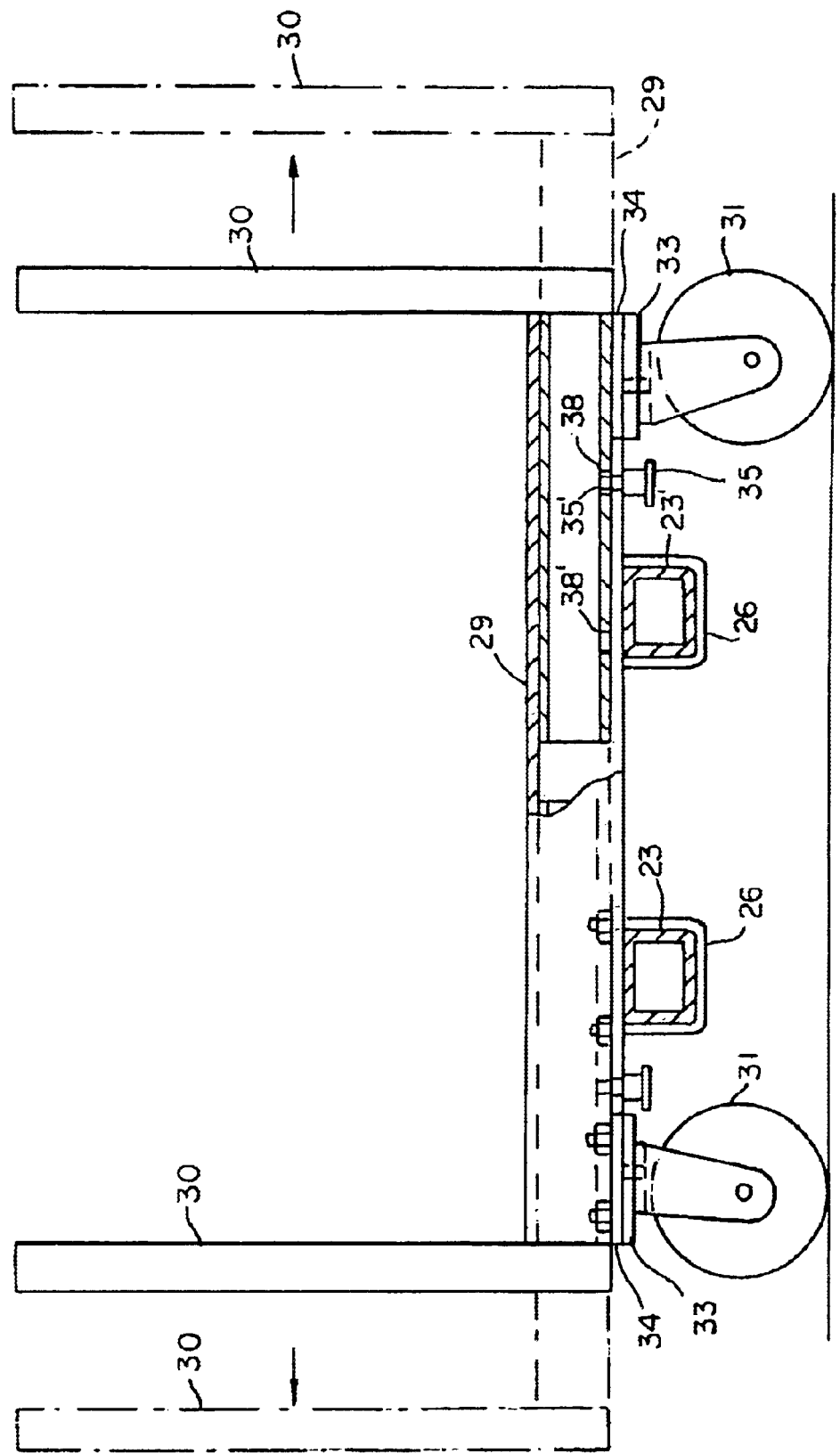

DRYWALL CART

This invention relates to panel carrying carts. More particularly, the invention relates to panel carrying carts for canning bulky objects such as panels.

It is an object of the invention to provide a novel panel carrying cart which has a main frame which pivotally mounted intermediate its length to enable the cart to flex about a horizontal axis to accommodate irregularities m the floor upon which the cart travels.

It is another object of the invention to provide novel panel carrying cart which has spaced upright bars spaced at intervals along the length of the frame of the cart which can be adjusted to different positions along the length of the frame and which upright bars are lateral outward to accommodate loads upon the cart of different widths.

It is another object to provide a novel panel carrying cart which can carry bulky object in varying amounts over varying terrain.

Further objects of the invention will become apparent as the description proceeds and when taken in conjunction with the accompanying drawings wherein:

BRIEF DESCRIPTION OF THE DRAWINGS

FIG. 2 is a cross sectional view of the panel carrying cart taken along line 2—2 of FIG. 1.

FIG. 3 is a fragmentary top view of the panel carrying cart invention

FIG. 4 is a view similar to FIG. 2 with portions of the lateral frame members of the cart cut away to reveal the interior thereof.

FIG. 5 is an enlarged fragmentary view of the pin lock mechanism.

BRIEF DESCRIPTION OF PREFERRED EMBODIMENT

Figure 1:
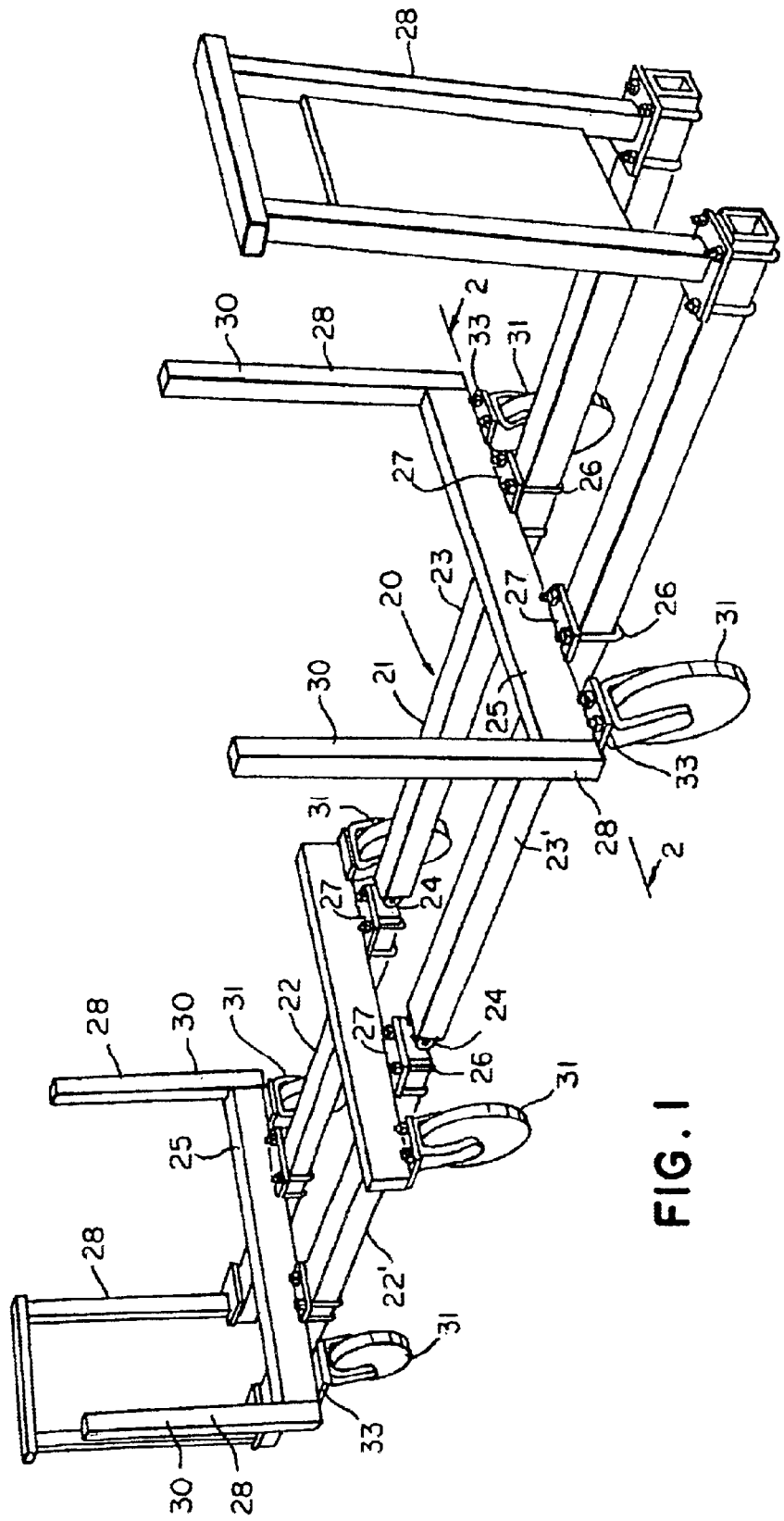
FIG. 1 is a perspective view of the panel carrying cart invention.

Briefly stated the invention comprises a panel carrying cart having an elongated frame formed of a dual pair of parallel bars with end of the bars pivotally mounted together about a horizontal axis. A pair of lateral rods are adjustably mounted at spaced intervals across each of the parallel bars to provide a rigid framework to each par of parallel bars while allowing each pair to pivot at their pivotal connection. A pair of L shaped rods each having one leg adjustably mounted in the outer opposite ends of the lateral rods to adjust laterally outward from one another with the other ends of the L shaped rods projecting upward to provide a means to hold panels within the confines of the upward extending rods of the L shaped rods while the panels are resting upon the lateral rods. The parallel rods are rotatably mounted on wheels to enable the parallel rods to be rolled on the wheels from place to place with the panels on the framework of the cart.

Referring more particularly to the drawings, in FIG. 1 the panel carrying cart 20 is illustrated having an elongated frame 21 with dual pair of elongated parallel rod frames 22 and 23 each having parallel rods 22' and 22" and 23' and 23". The frames 22 and 23 are pivotal mounted at their inner ends about horizontal axis at pivots 24 and 24. Three lateral horizontal tubular rods 25, 25', and 25" are mounted laterally across the parallel rods 22' and 22" and 23' and 23" by U bolts 26 which encircle the rods and are bolted to flanges 27 fixed to the lateral rods to fix the lateral rods to the parallel rods. The horizontal lateral rods are adjustable longitudinal along the parallel rods of frames 22 and 23 by unbolting the bolts 26 holding the lateral rods to the longitudinally extending parallel rods of frames 22 and 23 and then moving the lateral rods to a different positions on frame 22 and 23 and then rebolting the lateral rods to the longitudinal rods at their adjusted position.

A plurality of L shaped rods 28 each have one leg 29 adjustably mounted in the outer ends of each of the lateral rods 25, 25', 25". The other leg 30 of the L shaped rods extend upward on opposite sides of the frame 21. A plurality of wheels 31 are mounted to the lateral rods 25, 25', 25". Each wheel 31 has a U shaped housing pivotally mounted to plates 33. The plates 33 are mounted to the ends of the lateral rods 25, 25' and 25" by bolts extending through the plates 33 into plates 34 to hold the plate 33 to 34 and plates 34 are fixed to the lateral rods 25, 25', 25".

A spring loaded pin 35 is urged upward in a bore 36 in the bottom of the lateral rods 25, 25', and 25" on each end of the lateral rods by a spring 37 which is in a housing 37' fixed to the bottom of the lateral rods. The pin has a lower projecting flange 35' fixed to the pin outside the housing so that the operator may grasp the flange and pull the pin downward to remove the pin from engagement with one of the two selected bores 38 in each the lateral leg 29 of the L shaped leg rods 28. The pin has a projecting ridge 36' inside the housing which engages against the undersurface of the lateral rod to limit its upward movement to fully engage into the bore 35 in the bottom of the one leg of each of the L shaped rods, and the spring 37 is mounted coaxially about the pin inside the housing with its lower end engaged against the bottom of the housing and its upper end engaged against the projecting ridge 36' to maintain the pin engaged in the bore 35 in the one leg of the L shaped rod.

Each one leg 29 has two bores therein 38 and 38' to receive the upper end 35" of the pin 35 of the lateral rods 25, 25', 25" to enable the L shaped lateral rods 28 to be adjusted horizontally inward or outward to either of the two positions of the spaced bores in the one leg of the L shaped rods so that the rods may adjusted to either their inner position as shown in solid lines in FIG. 4 or to their outer position as shown in phantom lines in FIG. 4, whereupon the pin may be released to engage the inner or outer bore of the along each end of the lateral rods.

The cart is operated by loading drywall panels on the frame with their bottom edges resting on the lateral 25, 25', and 25" and their upper edges resting against the upward extending legs 30 of the L shaped rods for carrying panels on the cart while the cart is rolled along the floor on the wheels 31.

To adjust the L shaped lateral rods 28 laterally outward in the lateral rods 25, 25', 25" to their outer position, as shown in phantom lines in FIG. 4; the pin 35 will be withdrawn downward until the upper end of the pin is removed from the bore 38 in the lateral rods and clears the bottom of the one leg of the lateral rods 28 Then, the lateral rods may be slid longitudinally outward until the pin 35 is aligned with the other hole 38' in the rods 29, and the pin 35 will be urged upward into the outer hole 38' to lock the L shaped lateral rods in their outer position.

Thus it will be seen that a novel panel carrying cart has been provided for carrying bulky objects such as drywall panels along the ground or along interior flooring and the pivotal mounting of the front frame 22 to the rear frame 23 about the horizontal airs enables the frames to bend upward or downward to more readily accommodate variations in the height the flooring the cart may be traveling upon. The front and rear frames 22 and 23 are of equal length and mirror images of one another. The upright end frames 36 are fixed to the outer ends of each frame 22 and 23.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein

What is claimed is:

1. A dual frame drywall carrying cart comprising an elongated front and rear frame, each of said frames having a pair of parallel spaced elongated rods extending along the length of the frames in parallel spaced relation to one another, said front frame having a front and rear end portion and said rear frame having a front and rear portion with said front portion of said rear frame and said rear portion of said front frame pivotally connected together about a horizontal axis, three detachable lateral tubular rods each having a mounted bracket and a pair of wheels mounted beneath the rods, one of said lateral rods mounted adjustably on the front end of said front frame, a second one of said lateral rods being mounted adjustably on the rear end of said rear frame, and said third one of said lateral rods mounted adjustably on one of said frames adjacent said horizontal pivot to provide a rolling support for said cart, each of said lateral rods having open lateral outer ends capable of receiving a L shaped rod inserted into, each L shaped rod having one kg receivable in the open lateral outer ends of said lateral rod and said L shaped rods having another leg extending vertically upward from said lateral rods to provide a lateral support to support drywall on the frame within the legs extending vertically.

* * * * *